US007354544B1

(12) United States Patent
Stengrimsen

(10) Patent No.: US 7,354,544 B1
(45) Date of Patent: Apr. 8, 2008

(54) METHOD FOR MANUFACTURING A LONG-TERM STORAGE CONTAINER

(75) Inventor: Frank Stengrimsen, Lørenskog (NO)

(73) Assignee: Nuclear Protection Products AS, Kristiansand (NO)

( * ) Notice: Subject to any disclaimer, the term of this patent is extended or adjusted under 35 U.S.C. 154(b) by 70 days.

(21) Appl. No.: 11/010,734

(22) Filed: Dec. 13, 2004

(30) Foreign Application Priority Data

Oct. 19, 2004 (NO) .................................. 20044434

(51) Int. Cl.
*B29C 39/10* (2006.01)

(52) U.S. Cl. ....................... 264/250; 264/255; 264/275

(58) Field of Classification Search ................ 264/250, 264/255, 328.8; 250/507.1
See application file for complete search history.

(56) References Cited

U.S. PATENT DOCUMENTS 2,899,098 A * 8/1959 Gits ...................... 220/592.17
3,028,329 A * 4/1962 Mahlmeister ............... 376/420
4,382,055 A * 5/1983 Koyanagi et al. ........... 264/133
4,382,512 A 5/1983 Furminger
4,562,001 A * 12/1985 Vietzke et al. ................ 588/16
4,594,513 A * 6/1986 Suzuki et al. ............ 250/506.1
4,687,614 A * 8/1987 Suzuki et al. .............. 364/40.1
4,786,805 A * 11/1988 Priest ......................... 250/260
4,846,235 A * 7/1989 Handke .................. 141/311 R
4,996,019 A * 2/1991 Catalayoud et al. ........ 376/272
5,076,650 A * 12/1991 Klein et al. .............. 312/249.8
5,099,998 A 3/1992 Curzon et al.
5,225,114 A * 7/1993 Anderson et al. ............. 588/16
5,595,319 A 1/1997 Householder et al.
5,734,169 A 3/1998 Saidian
6,019,928 A * 2/2000 Fujitani et al. ............. 264/263
6,051,295 A * 4/2000 Schloss et al. ............. 428/35.7
6,110,576 A * 8/2000 Decker et al. ........... 428/300.1
6,639,236 B1 * 10/2003 Low et al. ............... 250/506.1
6,649,243 B2 * 11/2003 Roberts et al. ............... 428/99
6,699,439 B1 * 3/2004 Dannert et al. ............. 422/159
6,958,483 B2 * 10/2005 Georgii .................. 250/506.1
6,996,870 B2 * 2/2006 Hohlbein ..................... 15/110
2002/0014720 A1 * 2/2002 Sicilia et al. ............... 264/255
2002/0060300 A1 * 5/2002 O'kane et al. ........... 250/515.1
2002/0071953 A1 * 6/2002 Pophusen et al. ........... 428/421
2005/0115729 A1 * 6/2005 Shaw et al. ................... 174/50

FOREIGN PATENT DOCUMENTS

WO WO 01/57880 A1 8/2001

* cited by examiner

*Primary Examiner*—Edmund H. Lee
(74) *Attorney, Agent, or Firm*—Volpe and Koenig PC

(57) ABSTRACT

A method for manufacturing a long-term storage container for storage of radioactive material to inhibit radioactive radiation therefrom, said container having a bottom and upright wall extending therefrom, the top of said container to be closed by a screw-on radioactive radiation inhibiting lid, said container having an integral inner container part of plastic material with a bottom and upright wall, an integral outer container part of plastic material with a bottom and upright wall, and radioactive radiation inhibiting material in an inter space between the walls and bottoms of said inner and outer container parts. To fill the inter space an inter space container part is integrally molded through injection or pressure molding and then fitted to either the inner container part to subsequently mold the outer container part, or fitted inside the outer container part to subsequently mold the inner container part.

7 Claims, 6 Drawing Sheets

FIG. 5e
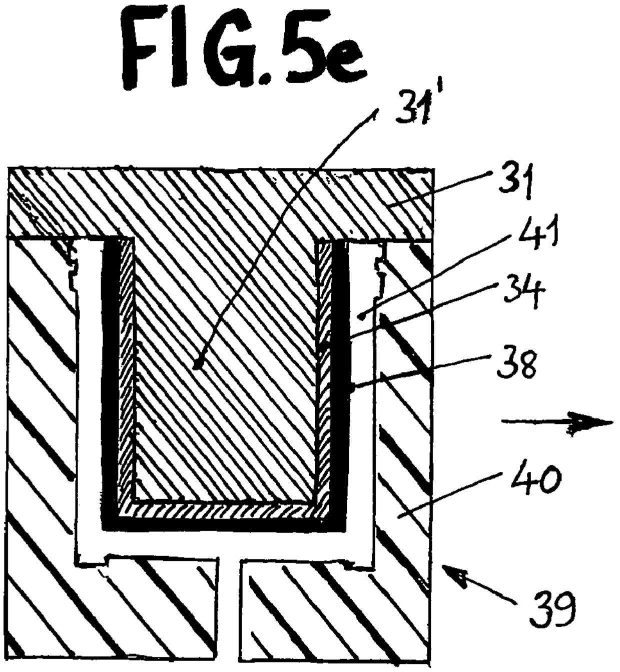
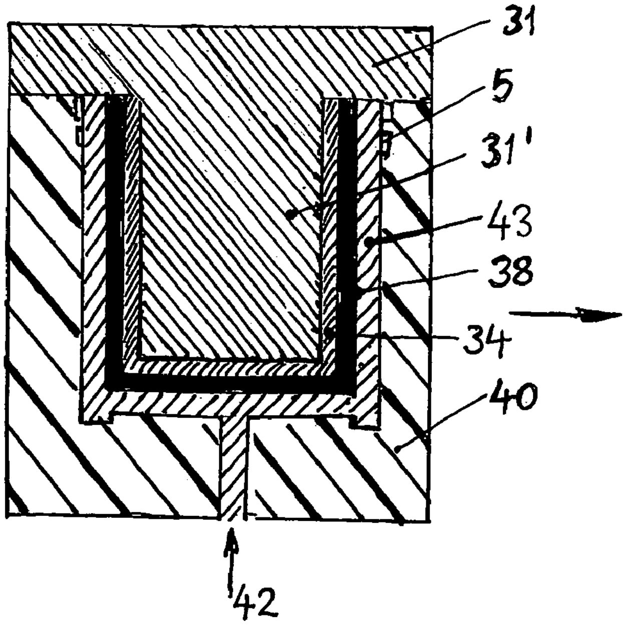
FIG. 5f
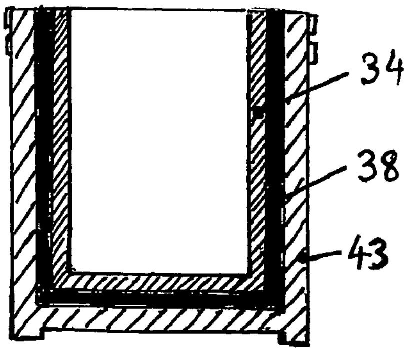
FIG. 5g

METHOD FOR MANUFACTURING A LONG-TERM STORAGE CONTAINER

FIELD OF INVENTION

The present invention relates to a method for manufacturing a long-term storage container for storage of radioactive material to inhibit radioactive radiation therefrom, said container having a bottom and upright wall extending therefrom, the top of said container to be closed by a screw-on lid, said container having an integral inner container part of plastic material with a bottom and upright wall, an integral outer container part of plastic material with a bottom and upright wall, and radioactive radiation inhibiting material in an inter space between the walls and bottoms of said inner and outer containers. The invention also relates to long-term storage container for storage of radioactive material to inhibit radioactive radiation therefrom.

Further, the invention relates to a method for manufacturing a radioactive radiation inhibiting lid suitable for fitting onto a top region of a long-term storage container for storage of radioactive material and inhibiting radioactive radiation therefrom. Also, the invention relates to a lid for use with such long-term storage container.

BACKGROUND

Long-term storage of radioactive material in a safe manner is an ever increasing environmental problem. Attempts have been made to have such material stored in metal barrels, but these are subject to rust or corrosion and therefore prone to leakage of the radioactive material.

To overcome such deterioration and possible leakage problem, there has been proposed to provide long-term storage containers of the type mentioned in the introductory part. Such container was essentially attempted made by inserting space members between the inner and outer container parts, and thereafter filling in liquid form the inter space with a radioactive radiation inhibiting material and leave it to solidify. However, tests proved that the inter space was not completely filled by the material, such as e.g. lead, thus leaving voids therein that would yield unacceptable radioactive radiation to the environment and cause serious health hazards to personnel handling such containers or moving about in storage rooms containing such containers filled with radioactive material. Further, such voids could only be spotted by carrying out expensive and time consuming tests, adding to the overall cost for each container, and destruction of unacceptable containers, as no means for repairs would be available In recognition of such defective manufacturing method, and also the urgent need for safer, long-term storage containers which are ready to use after manufacturing without necessity of subsequent radioactive radiation leakage tests, the present invention provides for a method and container having properties of an inter space container part made from a void free radioactive radiation inhibiting material, and being safe and simple to manufacture, thus providing a safe, reliable storage container not requiring subsequent reliability tests.

SUMMARY

In accordance with the invention the manufacturing method of such container comprises:

a) integrally casting in a first mould through injection moulding a first container part having a bottom and a wall, b) integrally casting in a second mould through injection or pressure moulding an inter space container part of said radioactive radiation inhibiting material, said inter space container part having a bottom and a wall and forming a second container part, c) removing a first part of the first mould which formed a first side wall face and a first bottom face of the first integral container part, d) removing said inter space container part from the second mould, e) placing said inter space container in fitting engagement with said first wall face and said first bottom face of the first container part to form a first assembly of container parts, and with the first container part in engagement with a portion of a second part of the first mould;

f) locating in a third mould the first assembly of container parts with said inter space container part in spaced relationship to a mould member of the third mould, so as to form a cavity between the member of the third mould and the inter space container part, the second part of the first mould having a portion inside the first container part to support it during moulding of a third container part, and a top of the second part of the first mould closing off an open end of said third mould member;

g) through injection moulding into said cavity integrally casting the third container part having a side wall and a bottom, and h) releasing a second assembly of container parts formed by the first, second and third container parts from the said third mould to provide said storage container.

In a most preferred embodiment said first container part is said inner container part, said first wall face and said first bottom face of the first container part are exterior faces of said inner container, and said first side wall face and said first bottom face of the inter space container part are interior faces of the inter space container part. Said step g) provides in addition for threads on the outside of said outer container part, said threads dimensioned to enable fitting engagement with threads on a lid to be fitted by screwing onto the storage container.

Suitably, said plastic material is high density polyethylene, and the inter space container part forming the second container part is moulded from a radioactive radiation inhibiting material which is selectable from one of: lead, lead alloy, tin and tin alloy.

The provision of threads on the outer container part also includes provision of locking means configured for non-releasable engagement with a locking member on said lid when said lid is fully screwed onto the container.

According to the invention the method for manufacturing the radioactive radiation inhibiting lid comprises:

a) casting in a first mould through injection moulding of a plastic material an integral first lid member with a top part and a skirt depending therefrom, said casting providing on an inside of said skirt threads to enable fitting engagement with external threads on said storage container, and said casting further providing in said top part at least one recess, b) releasing from the first mould said first lid member, c) filling in liquid form a radioactive radiation inhibiting material in an inside region of said first lid member and said at least one recess, and d) allowing said radioactive radiation inhibiting material to solidify to form a second lid member, material retained in said at least one recess in non-releasable way locking the second lid member to the first lid member.

It is important in a safe manner to be able to lift the storage container with its contents, and according to an embodiment of the lid manufacturing method the first mould is configured to provide at a lower end of the skirt a lifting or engagement face suitable to co-operate with a container lifting device when such device is made to engage a container having a fitted lid.

As soon as a storage container has been fully filled by radioactive substances and other material, it is important to be able to secure that the lid when fully screwed onto the storage container cannot be removed from the container. Therefore, the step of casting said lid threads includes providing a locking member for non-releasable engagement with locking means on the outside of the storage container when the lid is fully screwed onto the container.

Suitably, said plastic material in the lid is high density polyethylene, and said radioactive radiation inhibiting material is selected from lead, lead alloy, tin and tin alloy.

The storage container comprises an integral inner container part of plastic material with a bottom and upright wall, an integral outer container part of plastic material with a bottom and upright wall, and a radioactive radiation inhibiting material in an interspace between the walls and bottoms of said inner and outer storage container part, respectively. According to the invention, the radioactive radiation inhibiting material is in the form of an injection or pressure moulded, integral inter space container having a bottom and an upright wall extending therefrom. In a preferred version the outer container part is a storage container part moulded onto the outside of the inter space container when the inter space container is fitted onto the outside of the inner container.

According to an embodiment of the storage container the storage container has on an outside face of the outer container part threads configured to engage threads on said lid, and wherein the outer container part has locking means for non-releasable locking engagement with a locking member on said lid when said lid is fully screwed onto the storage container.

Further, said radioactive radiation inhibiting material is one of: lead, lead alloy, tin and tin alloy, and said plastic material is high density polyethylene.

The lid to be used with the storage container has an injection moulded, integral first lid member of plastic material with a top part and a skirt depending therefrom, an inside of said skirt having threads to enable fitting engagement with external threads on said storage container, and at least one recess in said top part, and a second lid member provided in the form of a solidified radioactive radiation inhibiting material located in an inside region of said first lid member and said at least one recess, said material retained in said at least one recess non-releasably locking the second lid member to the first lid member. The lid has a portion of said skirt configured to be able to engage a container lifting device.

Suitably, the first lid member of said lid is made of a plastic material, e.g. high density polyethylene, being the same as that of the inner and outer container parts, and said radioactive radiation inhibiting material is one of: lead, lead alloy, tin and tin alloy.

The invention is now to be described with reference to the attached drawing figures.

DETAILED DESCRIPTION OF THE PREFERRED EMBODIMENTS

Figure 1:
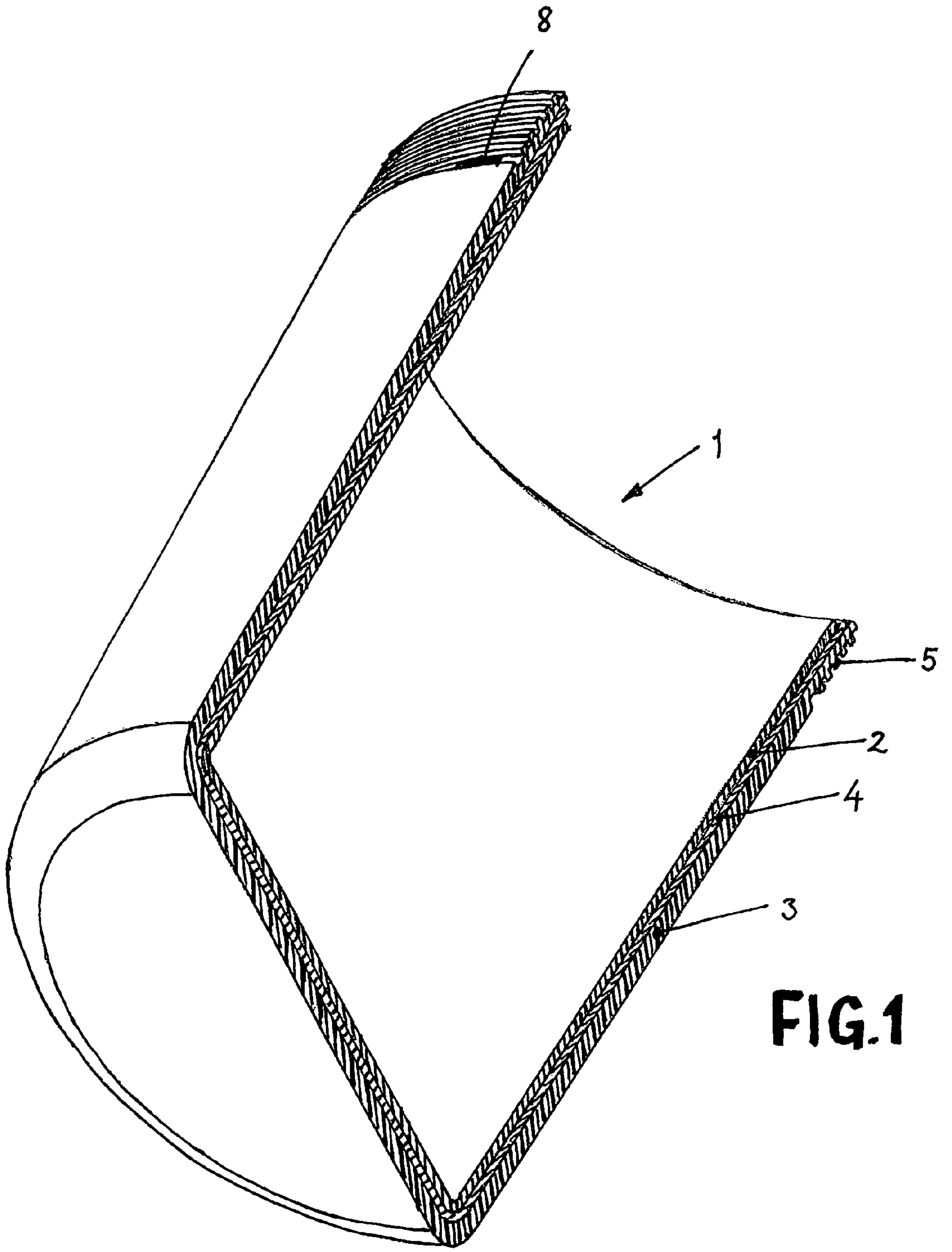
FIG. 1 shows in vertical section and perspective view a typical storage container, according to the invention.

FIG. 1 shows in vertical section and perspective view a half of storage container 1 according to the invention, having an inner container part 2, an outer container part 3, and an inter space container part 4.

It is noted that the inner container part 2 has integral bottom and upright wall. Also, the outer container part 3 has integral bottom and upright wall. An interspace between the inner container part 2 and the outer container part 3 is defined by an interspace container part 4 having a bottom and upright wall integrally made from a radioactive radiation inhibiting material through injection moulding or pressure moulding.

The inner and outer container parts 2, 3 are suitably made from a plastic material, e.g. high density polyethylene, through injection moulding, and the radioactive radiation inhibiting material is suitably one of: lead, lead alloy, tin and tin alloy.

Figure 2:
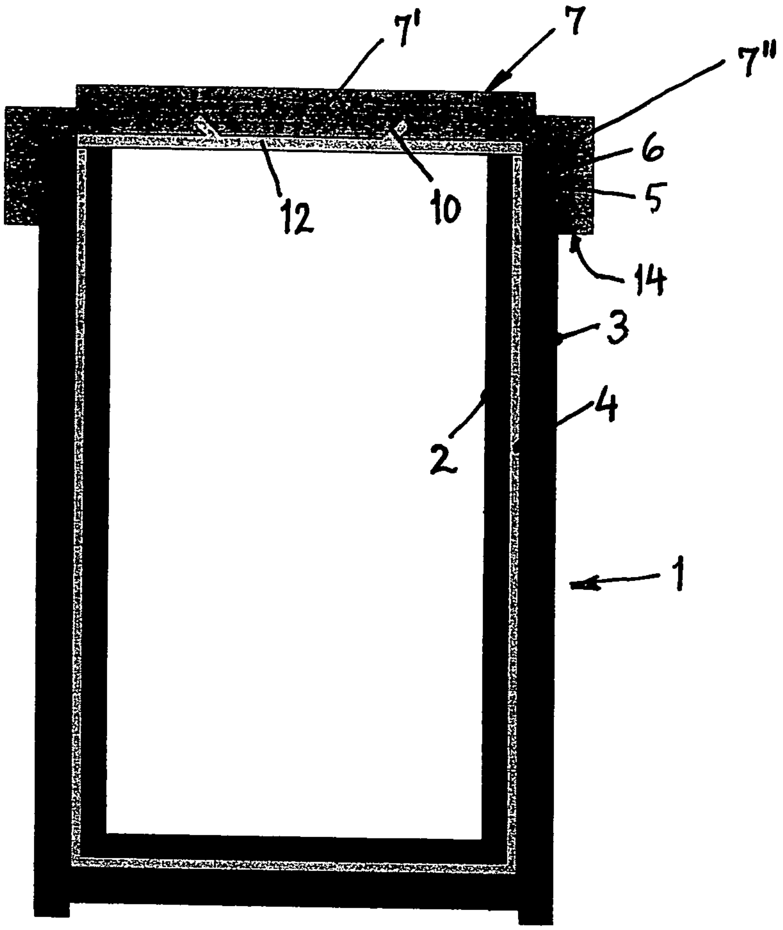
FIG. 2 shows schematically in cross-section a storage container according to the invention with a fitted lid.
Figure 3:
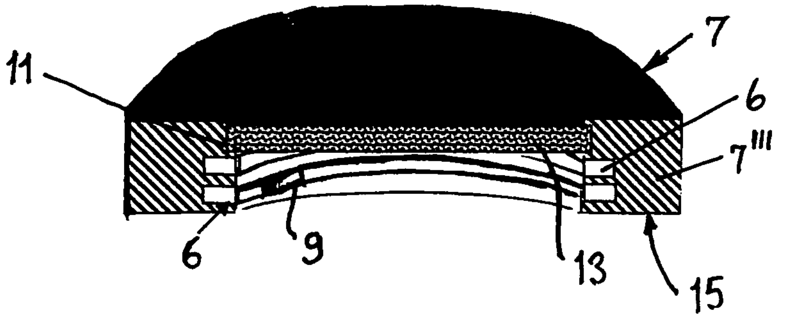
FIG. 3 shows a variant of the lid indicated in FIG. 2.

As shown on FIGS. 2 and 3 there is at an upper, outside region of the outer container part 3 provided threads 5 configured to engage threads 6 on a lid 7, and wherein the outer container part has locking means 8 for non-releasable locking engagement with a locking member 9 on said lid when said lid is fully screwed onto the storage container. Said locking means and locking member are merely indicated without illustrating any details. However, it will be visualized that a resilient member and a hook-like member could provide such locking, i.e. a sort of snap function.

The lid 7 has an injection moulded, integral first lid member 7', 7''; 7''' of plastic material in the form of a top part 7' and a skirt 7'' depending therefrom, an inside of said skirt 7'' having said threads 6 to enable fitting engagement with the external threads 5 on the storage container. There is in addition at least one recess 10; 11 in said top part, and a second lid member 12; 13 is provided in the form of a solidified radioactive radiation inhibiting material located in an inside region of said first lid member and said at least one recess, said material retained in said at least one recess 10; 11 non-releasably locking the second lid member 12; 13 to the first lid member 7', 7''; 7'''.

A bottom end 14; 15 portion of the skirt portion of said first lid member 7', 7''; 7''' is configured to be able to engage a container lifting device (not shown). Similarly to the storage container parts 2 and 3, the first lid member 7', 7''; 7''' is suitably made of a plastic material, e.g. high density polyethylene. The manufacturing of the first lid member is suitably through an injection moulding process. The radioactive radiation inhibiting material is suitably one of lead, lead alloy, tin and tin alloy.

Figure 4:
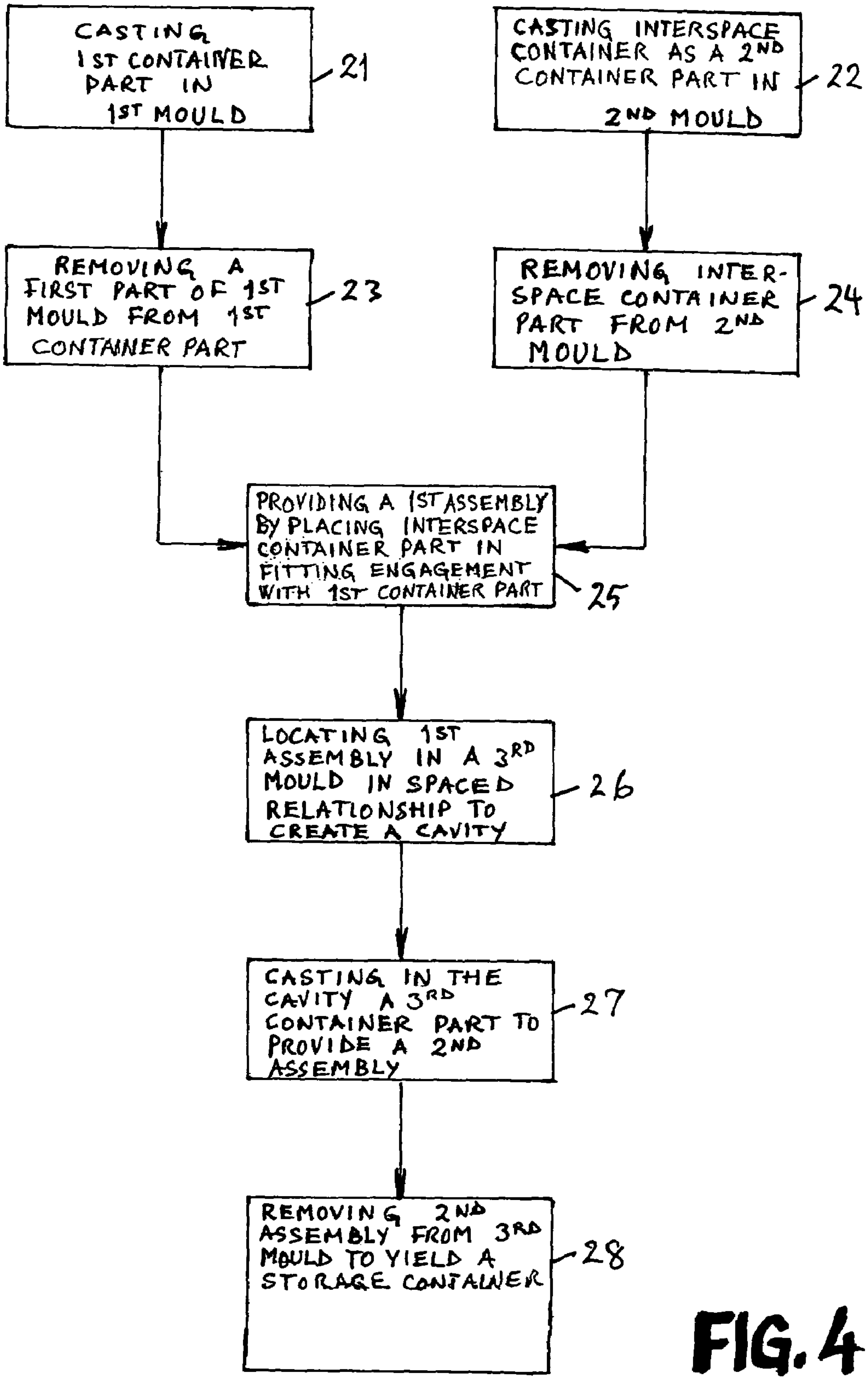
FIG. 4 is a simplified flow diagram illustrating major steps in the method for manufacturing the storage container.
Figures 5A, 5B, 5C, 5D:
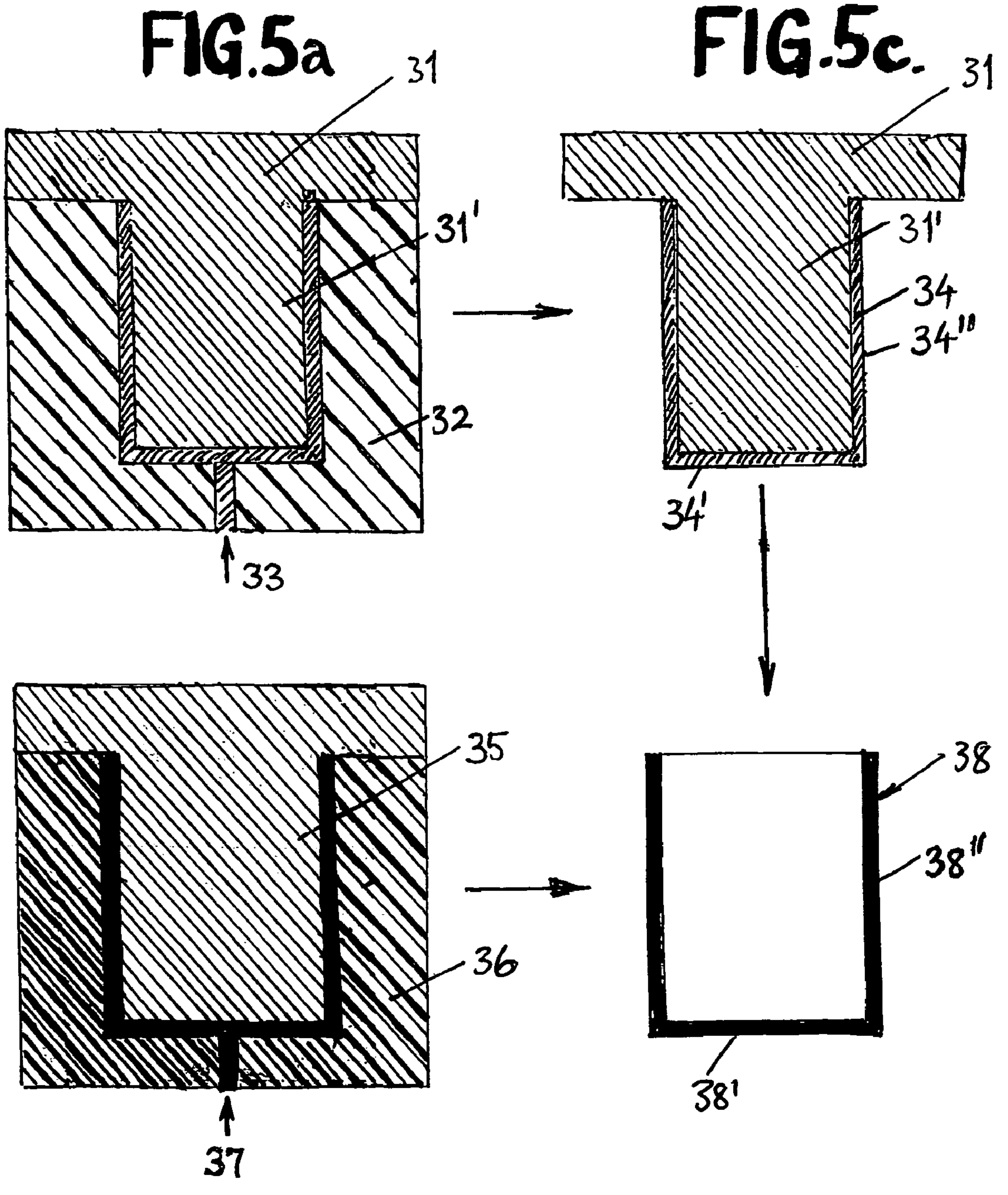
FIG. 5 is a simplified illustration of major steps of a preferred embodiment for manufacturing the storage container.

FIG. 4 shows the major steps of the method for manufacturing the long-term storage container for storage of radioactive material to inhibit radioactive radiation therefrom, as disclosed in connection with FIGS. 1, 2 and 3. The method comprises:

a) in step 21 integrally casting in a first mould 31, 31', 32 (FIG. 5*a*) through injection moulding via an inlet 33 (FIG. 5*a*) a first container part 34 (FIG. 5*a*) having a bottom 34' and a wall 34";

b) in step 22 integrally casting in a second mould 35, 36 (FIG. 5*b*) through injection or pressure moulding via an inlet 37 (FIG. 5*b*) an interspace container part 38 of said radioactive radiation inhibiting material, said interspace container part 38 having a bottom and a wall and forming a second container part;

c) in step 23 (FIG. 5*c*) removing a first part 32 (FIG. 5*a*) of the first mould 31, 31', 32 (FIG. 5*a*) which formed a first side wall face 34' (FIG. 5*a*) and a first bottom face 34" (FIG. 5*a*) of the first integral container part 34 (FIG. 5*c*);

d) in step 24 (FIG. 5*d*) removing said inter space container part 38 from the second mould 35, 36, e) in step 25 (FIGS. 5*c* and 5*d* combined) placing said inter space container part 38 in fitting engagement with said first wall face 34' (FIG. 5*a*) and said first bottom face 34" (FIG. 5*a*) of the first container part 34 (FIG. 5*c*) to form a first assembly of container parts 34, 38, and with the first container part in engagement with a portion 31' of a second part 31, 31' of the first mould;

f) in step 26 (FIG. 5*e*) locating in a third mould 39 (FIG. 5*c*); 52, 53 (FIG. 6*c*) the first assembly of container parts 34, 38 (FIG. 5*e*) with said inter space container part 38 in spaced relationship to a mould member 40 (FIG. 5*c*) of the third mould 39, so as to form a cavity 41 between the member 40 and the inter space container part 38, the second part 31, 31' of the first mould having a portion 31' inside the first container part 34 to support it during moulding of a third container part, and a top 31 of the second part of the first mould closing off an open end of said third mould member 40;

g) in step 27 (FIG. 5*f*) through injection moulding via inlet 42 into said cavity 41 integrally casting the third container part 43 (FIG. 5*f*) having a side wall and a bottom; and h) in step 28 (FIG. 5*g*) releasing a second assembly of container parts formed by the first, second and third container parts 34, 38, 43 (FIG. 5*g*) from the said third mould 39 (FIG. 5*c*), however noting that also the mould member 31, 31' is removed.

It is observed that in FIG. 5 the first container part 34 is said inner container part, and that the inter space container part 38 forms the second container part and fits onto the outside of the container part 34.

Suitably in the injection moulding process of the inner and outer container parts there is used a plastic material which is e.g. high density polyethylene.

The inter space container part 38 forming the second container part is moulded from a radioactive radiation inhibiting material selectable from one of: lead, lead alloy, tin and tin alloy.

Following the procedure according to FIG. 5, step 27 (FIG. 5*f*) in addition provides for threads 5 on the outside of said outer container part, said threads dimensioned to enable fitting engagement with threads on a lid to be fitted by screwing onto the storage container.

Further, the provision of threads on the outer container part also includes provision of locking means configured for non-releasable engagement with a locking member on said lid when said lid is fully screwed onto the container.

Figure 6:
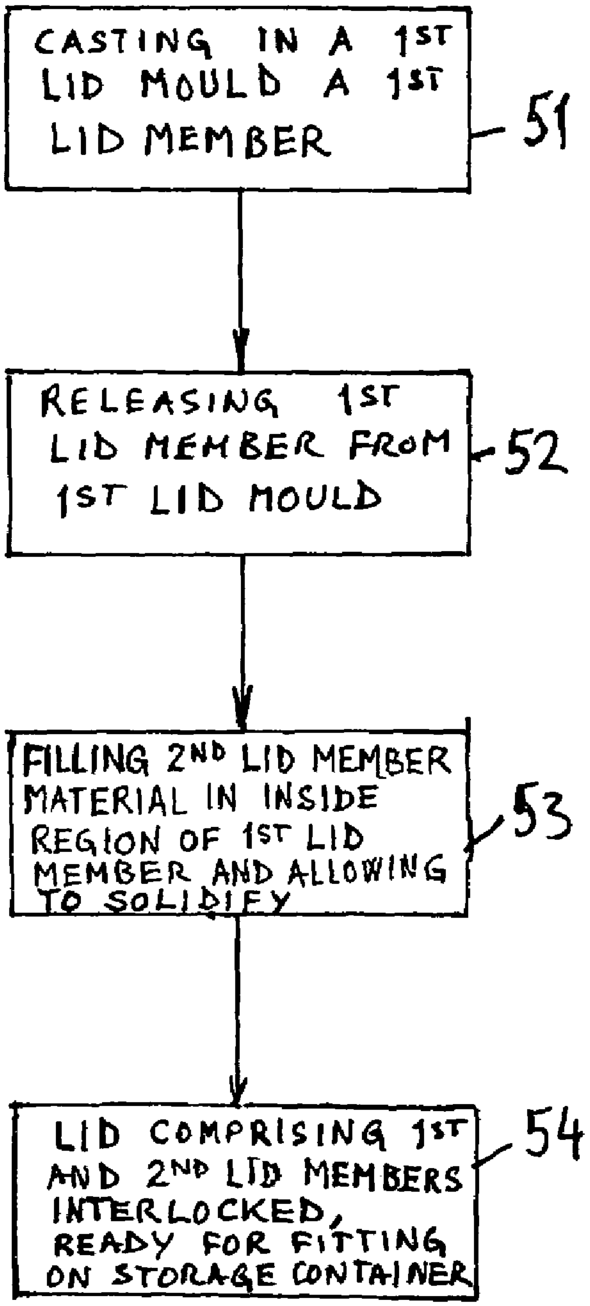
FIG. 6 is a simplified flow diagram illustrating major steps in the method for manufacturing the lid to be used with the storage container.

With reference to FIG. 6 the method for manufacturing the radioactive radiation inhibiting lid which is suitable for fitting onto a top region of a storage container for long term storage of radioactive material and inhibiting radioactive radiation therefrom, comprises:

a) in step 51 casting in a first mould through injection moulding of a plastic material, e.g. high density polyethylene, an integral first lid member with a top part 7' and a skirt 7" depending therefrom, said casting providing on an inside of said skirt threads 6 to enable fitting engagement with external threads 5 on said storage container 1, said casting further providing in said top part at least one recess 10; 11, b) in step 52 releasing from the first mould said first lid member 7', 7"; 7" in step 53 filling in liquid form a radioactive radiation inhibiting material in an inside region of said first lid member and said at least one recess, and c) in step 54 allowing said radioactive radiation inhibiting material, suitably selected from lead, lead alloy, tin and tin alloy, to solidify to form the second lid member 12; 13, material retained in said at least one recess 10; 11 non-releasably locking the second lid member to the first lid member.

The first mould is configured to provide at a lower end 14; 15 of the skirt a lifting or engagement face suitable to cooperate with a container lifting device (not shown) when such device is made to engage a container having a fitted lid.

Step 51 also includes in casting said threads 6 provision of a locking member 9 for non-releasable engagement with locking means 8 on the outside of the storage container when the lid is fully screwed onto the container.

The invention claimed is:

1. A method for manufacturing a long-term storage container for storage of radioactive material to inhibit radioactive radiation therefrom, said container to have a bottom and upright wall extending therefrom, the top of said container configured to receive and be closable when a separate screw-on lid is fitted thereon, said container to have an integral inner container part of plastic material with a bottom and upright wall, an integral outer container part of plastic material with a bottom and upright wall, and radioactive radiation inhibiting material in an inter space between the walls and bottoms of said inner and outer container parts; the method comprising:

a) integrally casting in a first mould from plastic material a first container part forming said integral inner container part;

b) integrally casting in a second mould a moulded inter space container part of said radioactive radiation inhibiting material, said inter space container part having a bottom and a wall and forming a second container part;

c) removing a first part of the first mould which formed a first side wall face and a first bottom face of the first container part;

d) removing said inter space container part from the second mould;

e) placing said inter space container in fitting engagement with said first wall face and said first bottom face of the first container part to form a first assembly of container parts, and with the first container part in engagement with a portion of a second part of the first mould;

f) locating in a third mould the first assembly of container parts with said inter space container part in spaced relationship to a mould member of the third mould, so as to form a cavity between the member of the third mould and the inter space container part, the second part of the first mould having a portion inside the first container part to support it during moulding of the third container part, and a top of the second part of the first mould closing off an open end of said third mould member;

g) through injection moulding of plastic material into said cavity integrally casting a third container part as said integral outer container part; and h) releasing a second assembly of container parts formed by the first, second and third container parts from the said third mould to provide said storage container.

2. A method according to claim 1, wherein said first container part is said inner container part, wherein said first wall face and said first bottom face of the first container part are exterior faces of said inner container part, and wherein said first side wall face and said first bottom face of the inter space container part are interior faces of the inter space container.

3. A method according to claim 1, wherein said plastic material is high density polyethylene.

4. A method according to claim 1, wherein said inter space container part forming the second container part is moulded from a radioactive radiation inhibiting material which is selectable from one of: lead and lead alloy.

5. A method according to claim 1, wherein said step g) in addition provides for threads on the outside of said outer container part, said threads dimensioned to enable fitting engagement with threads on a lid to be fitted by screwing onto the storage container.

6. A method according to claim 5, wherein the provision of threads on the outer container part also includes provision of locking means configured for non-releasable engagement with a locking member on said lid when said lid is fully screwed onto the storage container.

7. A method according to claim 1, wherein the inter space container part of said radioactive radiation inhibiting material is cast by pressure moulding.

* * * * *